(12) United States Patent
Knauer

(10) Patent No.: US 11,584,453 B2
(45) Date of Patent: Feb. 21, 2023

(54) TRIM PANEL ARRANGEMENT FOR TRIMMING A BODY ELEMENT FOR A MOTOR VEHICLE, AND METHOD FOR FORCED MOVEMENT OF AN AIR GUIDE DEVICE OF A TRIM PANEL ARRANGEMENT

(71) Applicant: Magna Exteriors GmbH, Sailauf (DE)

(72) Inventor: Bernd Knauer, Stuttgart (DE)

(73) Assignee: MAGNA EXTERIORS GMBH, Sailauf (DE)

( * ) Notice: Subject to any disclaimer, the term of this patent is extended or adjusted under 35 U.S.C. 154(b) by 102 days.

(21) Appl. No.: 17/351,352

(22) Filed: Jun. 18, 2021

(65) Prior Publication Data

US 2022/0024527 A1    Jan. 27, 2022

(30) Foreign Application Priority Data

Jul. 21, 2020   (DE) .......................... 102020209130.7

(51) Int. Cl.
*B62D 35/00* (2006.01)
*B62D 35/02* (2006.01)
*B60R 13/04* (2006.01)

(52) U.S. Cl.
CPC ............ *B62D 35/008* (2013.01); *B60R 13/04* (2013.01); *B62D 35/02* (2013.01)

(58) Field of Classification Search
CPC .... B62D 25/02; B62D 25/025; B62D 35/008; B62D 35/02; B60R 13/04; B60R 13/043
See application file for complete search history.

(56) References Cited

U.S. PATENT DOCUMENTS

| 4,582,351 | A | 4/1986 | Edwards |
| 8,702,152 | B1 | 4/2014 | Platto et al. |
| 9,975,490 | B1 | 5/2018 | Ozog et al. |
| 2008/0100071 | A1* | 5/2008 | Browne ............... B62D 25/182 292/341.17 |
| 2016/0264057 | A1* | 9/2016 | Lee .......................... B60R 3/02 |
| 2017/0039469 | A1* | 2/2017 | Majumdar ........... G06V 10/764 |
| 2017/0057565 | A1* | 3/2017 | Sarhadiangardabad ..................... B62D 35/02 |
| 2017/0137075 | A1* | 5/2017 | Povinelli .............. B62D 35/008 |
| 2018/0134221 | A1* | 5/2018 | Burton ................. B62D 35/008 |
| 2018/0244228 | A1* | 8/2018 | Desjardins ............. F16M 13/02 |

(Continued)

FOREIGN PATENT DOCUMENTS

| DE | 3613301 | A1 | 10/1987 |
| DE | 202011005504 | U1 | 10/2011 |
| DE | 102019128309 | B3 | 2/2021 |

*Primary Examiner* — Gregory A Blankenship
(74) *Attorney, Agent, or Firm* — Dickinson Wright PLLC

(57) ABSTRACT

The invention concerns a trim panel arrangement for trimming a body element of a vehicle, with a pivotably mounted air guide device which is movable by means of a kinematic arrangement into a retracted first function position and a fully extended second function position and vice versa. At low speeds and also at high speeds, this should ensure an optimum aerodynamics of the motor vehicle in the air flow. This is achieved in that the air guide device is formed in two parts and comprises a first and a second trim part which are pivotably connected together, and that the kinematic arrangement is formed from a primary and a secondary lever drive. The invention furthermore concerns a method for forced movement of the air guide device.

8 Claims, 4 Drawing Sheets

(56) References Cited

U.S. PATENT DOCUMENTS

| | | | |
|---|---|---|---|
| 2019/0084630 A1* | 3/2019 | Potvin | B62D 37/02 |
| 2019/0161123 A1* | 5/2019 | Shen | B62D 35/008 |
| 2020/0094889 A1* | 3/2020 | Shiga | B62D 35/02 |
| 2021/0016724 A1* | 1/2021 | Hahn | B60R 13/04 |
| 2021/0221449 A1* | 7/2021 | Milani | B60R 3/02 |
| 2022/0024527 A1* | 1/2022 | Knauer | B62D 35/008 |
| 2022/0048445 A1* | 2/2022 | Hahn | B62D 25/025 |
| 2022/0212731 A1* | 7/2022 | Moradnia | B62D 35/008 |

* cited by examiner

TRIM PANEL ARRANGEMENT FOR TRIMMING A BODY ELEMENT FOR A MOTOR VEHICLE, AND METHOD FOR FORCED MOVEMENT OF AN AIR GUIDE DEVICE OF A TRIM PANEL ARRANGEMENT

CROSS-REFERENCE TO RELATED APPLICATIONS

This application claims priority to German Application No. DE 102020209130.7 filed Jul. 21, 2020. The entire disclosure of the above application is incorporated herein by reference.

FIELD OF THE INVENTION

The present invention concerns a trim panel arrangement for trimming a body element for a motor vehicle, and a method for forced movement of an air guide device of a trim panel arrangement.

BACKGROUND OF THE INVENTION

This section provides information related to the present disclosure which is not necessarily prior art.

The side member (side sill) is a region of the self-supporting body of a motor vehicle and is situated along the bottom of both sides thereof between the front and rear wheel arches.

In the region of the side member and floor, motor vehicles comprise trim elements which are provided in order to improve the aerodynamics or appearance or to protect the metal panelling.

Many motor vehicles in the lower side region only have a fixedly installed vehicle sill, the design of which is based on aerodynamic and aesthetic aspects and on legal requirements. Because of these requirements which influence the design of the vehicle sill, from an aerodynamic aspect compromises must be made. The ground clearance in particular is taken into account in the design of the vehicle sill, wherein this is usually designed for low speeds.

As a result, the air flow below the vehicle is not optimally aerodynamic at higher speeds.

DE 36 13 301 A1 describes a car with a side trim panel in the region of a side sill. The side trim panel can be retracted and extended by adjustment elements depending on vehicle speed. At higher vehicle speeds, the side trim panel in the extended position improves the aerodynamics of the vehicle. In the retracted position when the vehicle is stationary however, it does not detract from the vehicle's appearance.

DE 20 2011 005 504 U1 discloses a motor vehicle with an air guide device. The air guide device is arranged on a base fixed to the body and comprises a guide element extending in the vehicle longitudinal direction. This guide element can be moved by means of an actuating mechanism between a retracted rest position and an extended operating position.

DE 10 2019 128 309 B3 describes a drive device for an adjustable air guide element of a motor vehicle. The air guide element may be adjusted between an extended position and a retracted position. The angle of attack of the air guide element may also be changed.

Furthermore, US 2019/0 161 123 A1 discloses a motor vehicle with side trim panels arranged pivotably in the region of the side sills. The side trim panels are produced in two pieces and can be extended.

U.S. Pat. No. 9,975,490 B1 describes a motor vehicle with side steps, brackets with a base plate and a flat plate, and an actuating mechanism with a first connecting member, a second connecting member and an actuator. The side steps may be moved, speed-dependently, into at least one of an access step position, an aerodynamic position and a stowage position.

U.S. Pat. No. 8,702,152 B1 presents an extendable air flap arrangement for a motor vehicle. The air flap assembly comprises an air deflector plate which is adapted such that it can be mounted next to a front bumper of a vehicle and moved by means of a linear actuator between a stowed position, in which the air deflector plate is at least partially covered by the front bumper, and an extended position.

U.S. Pat. No. 4,582,351 A describes front and rear bumpers which may be raised and lowered hydraulically. The bumpers can be locked in the set position.

SUMMARY OF THE INVENTION

This section provides a general summary of the disclosure, and is not a comprehensive disclosure of its full scope or all of its features.

It is an object of the invention to create a motor vehicle with a trim panel arrangement in the region of the side member, wherein said arrangement is adjustable and allows optimal aerodynamics of the motor vehicle in the air flow both at low speeds and at high speeds.

This object is achieved by the present invention by an arrangement with the features given in claim 1.

The trim panel arrangement here comprises an air guide device produced in two parts, which is adjustable between a retracted first function position and a fully extended second function position.

Because of said adjustability of the air guide device, the aerodynamic function of the motor vehicle at high speeds may be improved without adversely affecting the ground clearance and function of the motor vehicle at low speeds.

Because of the two-part design of the air guide device and the use of a primary and a secondary lever drive, a maximum extension depth in the Z direction can be achieved in the extended second function position. At the same time, in the retracted first function position, a minimal installation space in the Y direction is required.

By use of a shaft, the force of an actuator can be reliably transmitted to the corresponding lever linkages of the secondary and primary lever drives. Furthermore, it is possible to match the position of the drive to the circumstances of the motor vehicle with respect to installation space.

This adjustment takes place via a kinematic arrangement comprising a primary and a secondary lever drive.

Advantageous embodiments of the present invention are given in the subclaims.

The X, Y and Z directions refer below to a conventional vehicle coordinate system, wherein the X direction is the longitudinal direction, the Y direction is the transverse direction, and the Z direction is the vertical direction of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the full scope of the claimed inventions.

The drawings show:

DESCRIPTION OF THE INVENTION

Figure 1:
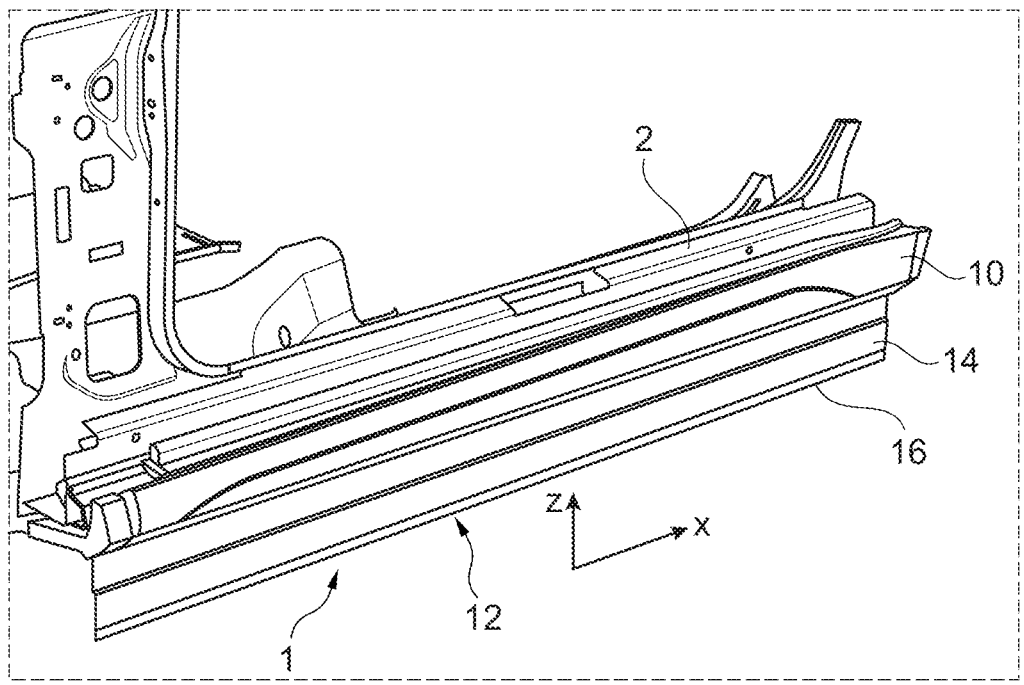
FIG. 1 is a perspective view of a side member in the region of a door opening in the body, with an adjustable trim panel arrangement in a fully extended operating position.

FIG. 1 shows a view of a side member/sill 2 in the region of a door opening 3 in the body, with an adjustable trim panel arrangement 1 in a fully extended function position. The trim panel arrangement 1 is here configured as an outer sill trim (side member trim) which covers the lower edge of the door opening as protection from damage and dirt.

For this, the trim panel arrangement 1 comprises a first trim element 10 running in the longitudinal direction, which is preferably made of a form-rigid plastic material and covers the side member 2 on the body between the front wheel and the rear wheel towards the outside (Z direction) and downward (Y direction).

The trim panel arrangement 1 here comprises an air guide device 12 formed in two parts, which is designed to be adjustable between a retracted first function position and a fully extended second function position. The two-part air guide device 12 here has a first trim part 14 and a second trim part 16. The first trim part 14 is a strip-like flap element which extends in the longitudinal direction and is attached to the body in the region of the lower front edge of the first trim element 10 so as to be pivotable about a longitudinal axis. The pivot axis is designated S2. The second trim part 16 is also configured as a strip-like flap element, wherein the width B2 of the trim part is many times smaller than the width B1 of the trim part 14.

The second trim part 16 also extends in the longitudinal direction directly on the long side 15 of the trim part 14 facing away from the trim element 10, where it is attached so as to be pivotable about a longitudinal axis. The pivot axis is designated S3.

Figure 2:
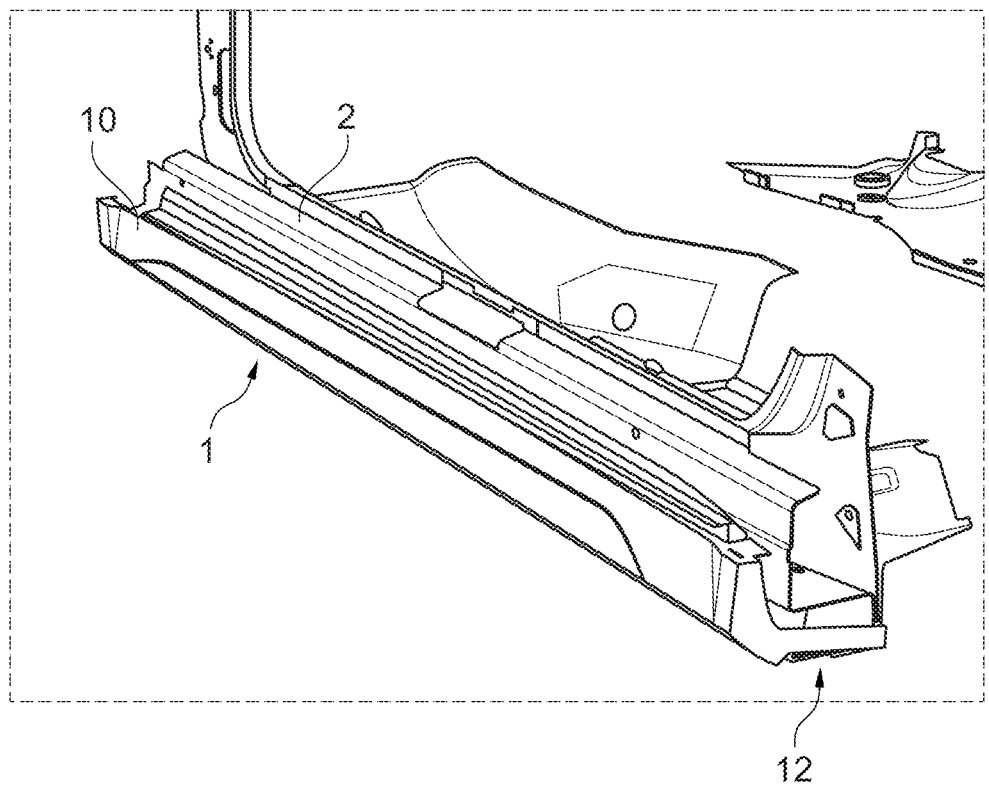
FIG. 2 is a perspective view of the side member in the region of the door opening in the body, with the adjustable trim panel arrangement in a fully retracted operating position.
Figure 3:
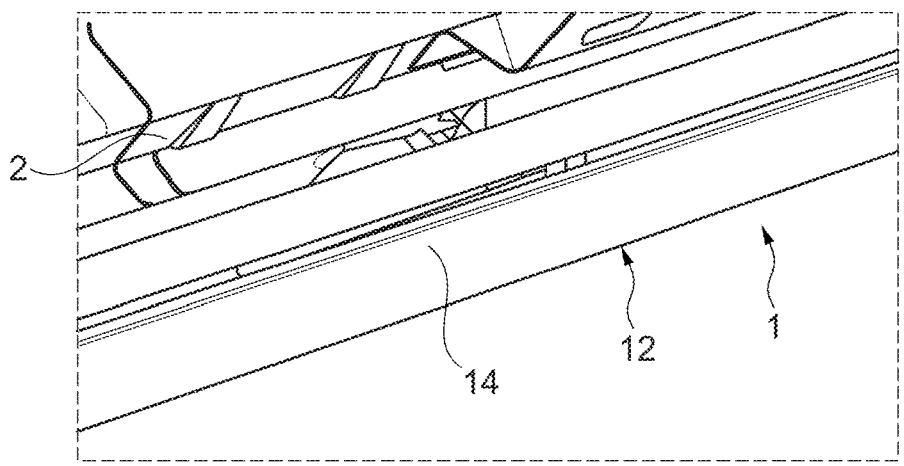
FIG. 3 is a perspective view looking from the vehicle underside towards the outside onto the trim panel arrangement in the fully retracted operating position.
Figure 4:
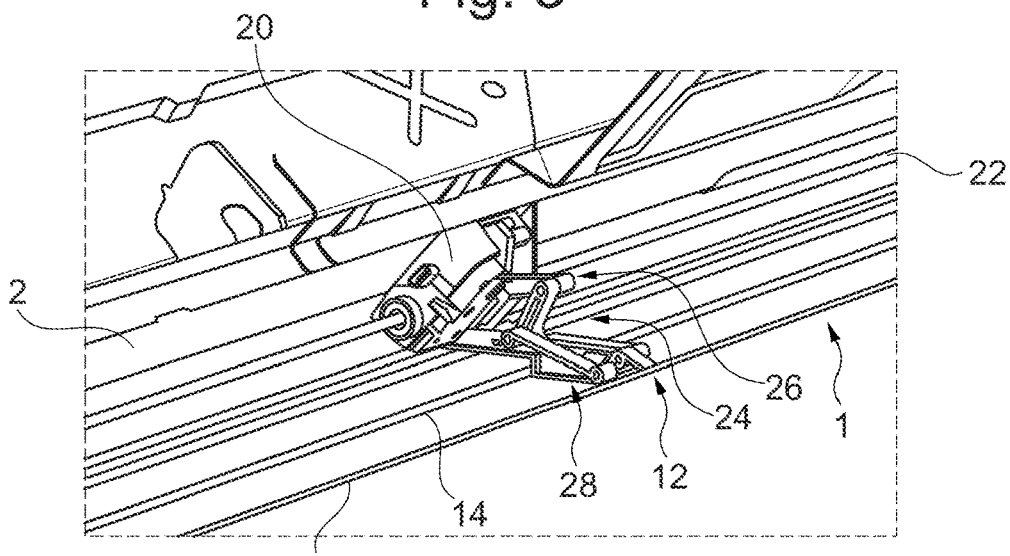
FIG. 4 is a perspective view looking from the vehicle underside towards the outside onto the trim panel arrangement in a partially extended operating position, with adjustment device.
Figure 5:
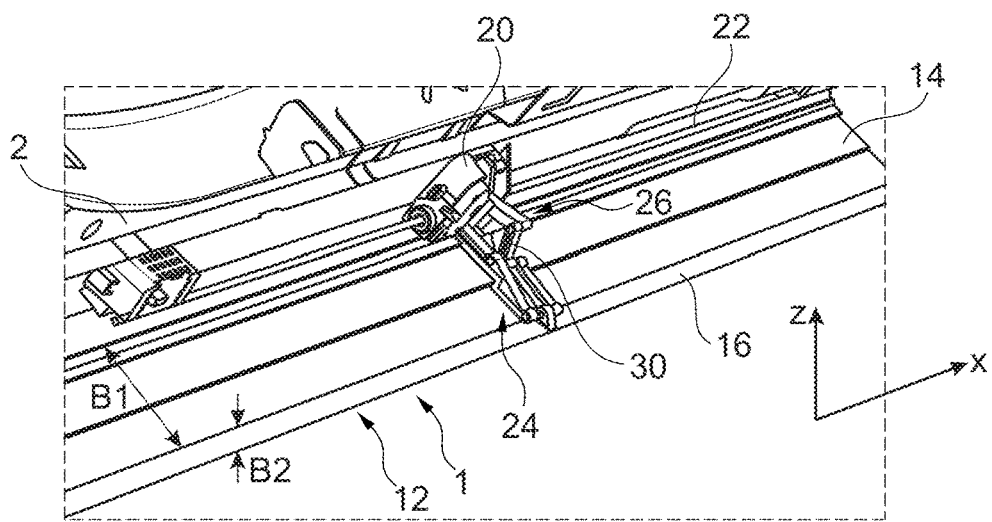
FIG. 5 is a perspective view looking from the vehicle underside towards the outside onto the trim panel arrangement in the fully extended operating position, with adjustment device.

The fully retracted function position is shown in FIG. 2. In this function position, the maximum ground clearance is achieved, i.e. the maximum distance between the underside of the trim panel arrangement and the ground surface. In the second function position shown in FIG. 1, the air guide device 12 is substantially fully extended towards the ground in the Z direction. In this second function position, minimum ground clearance is achieved.

It is evident that any arbitrary intermediate position may also be set.

In order to achieve this movement of the first and second trim parts 14, 16 shown in the figures, an adjustment device is provided. The adjustment device comprises an actuator 20 which is attached to the body on the underside in the region of the side member and can provoke the movement of the trim parts 14, 16 into the function positions via a shaft 22 running in the longitudinal direction and a plurality of kinematic arrangements 24 positioned in the longitudinal direction.

The shaft 22 is here mounted on carrier elements 24 which point in the Z direction and are attached to the side of the side member facing the ground, spaced apart in the X direction. The actuator 20 here acts directly or indirectly on the shaft 22 and, with corresponding actuation, initiates a rotary movement of the shaft 22.

The kinematic arrangement 24 comprises a primary and a secondary lever drive 26, 28.

The adjustment movement is transmitted to the first trim part 14 via the primary lever drive 26. For this, the primary lever drive 26 has a first lever 27 and a rocker 30. By means of its first end region 27a, the first lever 27 is mounted rotationally fixedly on the shaft 22. The second end region 27b of the lever 27 is attached to a first end region 32 of the rocker 30 via a first pivot joint 29. In its middle region, the rocker 30 has an articulated connection to the first trim part 14. For this, a second pivot joint 34 is provided on the inwardly facing surface between the rocker 30 and the trim part 14.

The second trim part 16 is hinged onto a second end region 36 of the rocker 30 via a connection by means of the secondary lever drive 28. The secondary lever drive 28 for this has a second lever 38 which, at its first end region 40, is connected to the second end region 36 of the rocker via a third pivot joint 42. By means of its second end region 44, the second lever 38 is connected to the second trim part 16 via a fourth pivot joint 46. As evident from the drawings, the second pivot joint is arranged on the inwardly facing surface of the trim part 16 in the region of its lower edge 48.

The kinematic arrangement described above is a seven-link kinematic chain.

Figure 6:
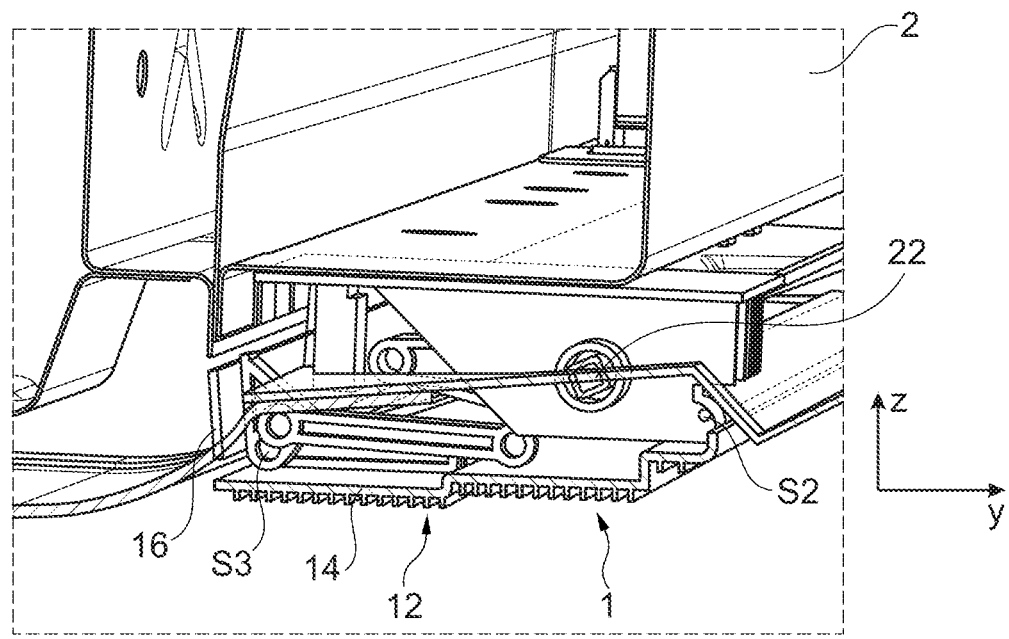
FIG. 6 is a sectional view taken through the side member with adjustable trim panel arrangement looking onto the adjustment device, in the fully retracted operating position.
Figure 7:
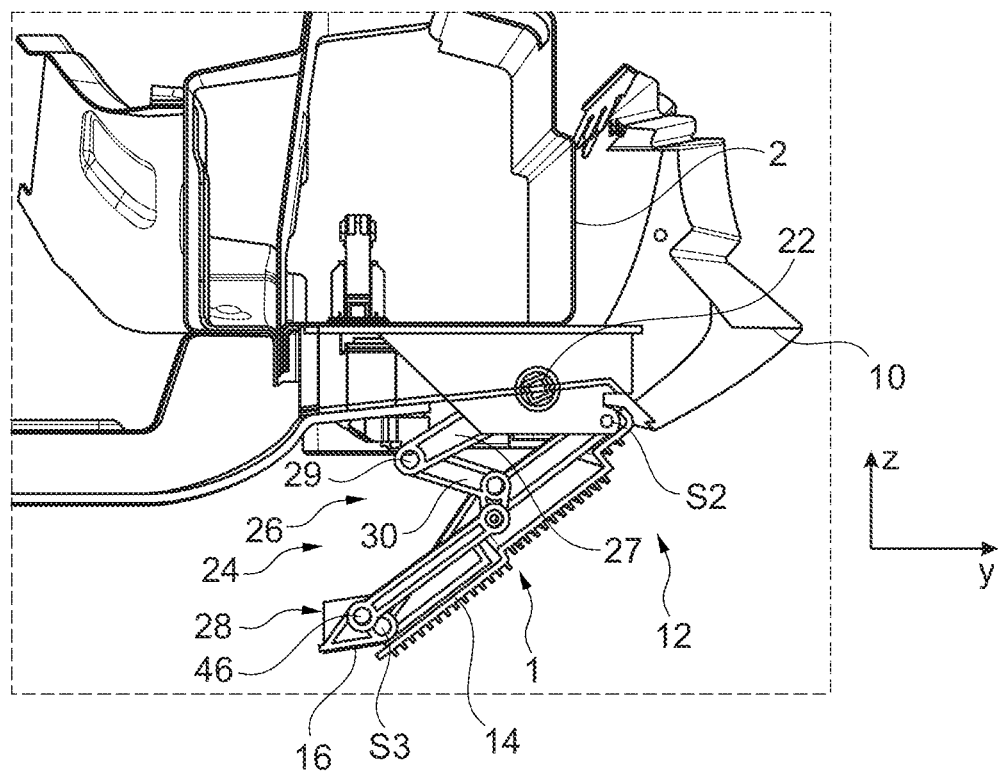
FIG. 7 is a sectional view taken through the side member with adjustable trim panel arrangement looking onto the adjustment device, in a partially extended operating position.
Figure 8:
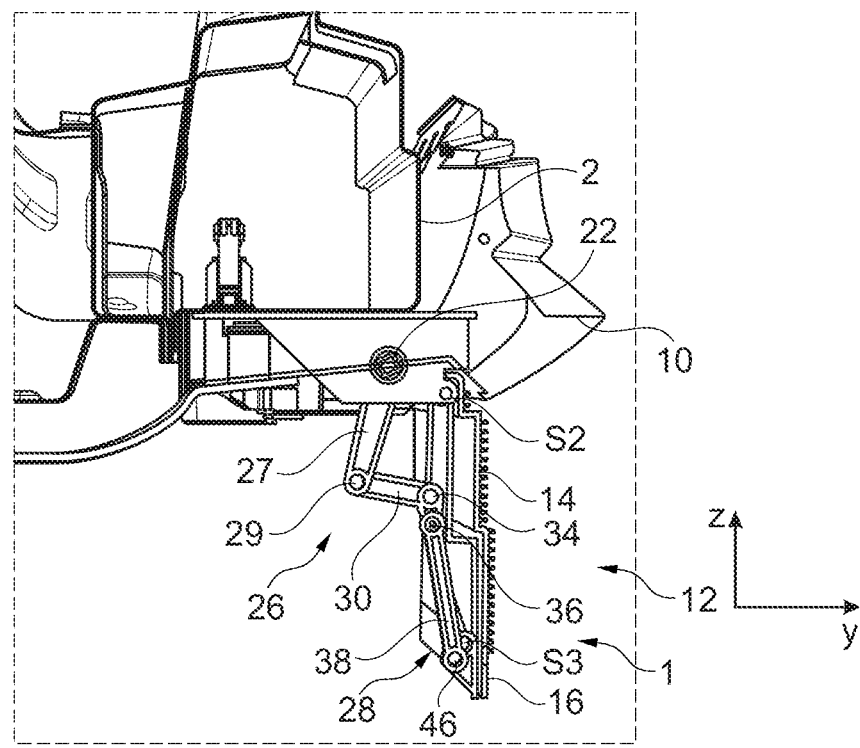
FIG. 8 is a sectional view taken through the side member with adjustable trim panel arrangement looking onto the adjustment device, in the fully extended operating position.
Figure 9:
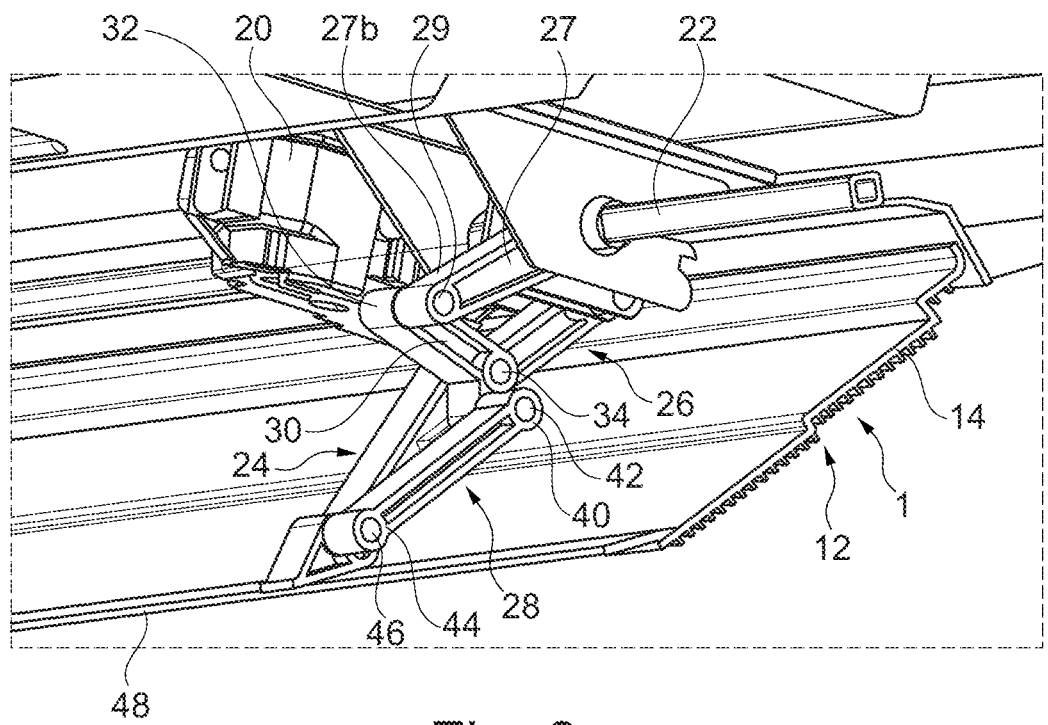
FIG. 9 is a perspective view looking from the vehicle underside towards the outside onto the adjustable trim panel arrangement in an extended operating position.

As clearly evident in particular from the sectional illustration in FIG. 6, in the first function position, the first trim part 14 lies parallel to the underside of the side member 2. The second trim part 16 is here pivoted about the pivot axis S3, starting from the lower edge of the first trim part 14, into a position pointing approximately vertically upward in the Z direction. Thus viewed in the Y direction, an arrangement of the trim panel arrangement 1 can be achieved which is optimised with respect to installation space.

For the forced movement of the two-piece air guide device 12, initially the first trim part 14 is pivoted outward and downward via the primary lever drive 26. During this adjustment movement, at the same time via the secondary lever drive 28, the second trim part 16 is rotated about the pivot axis S3 so that, starting from the position pointing upward in the Z direction, this is twisted into a position pointing downward in the Z direction.

What is claimed:

1. A trim panel arrangement for trimming a body element of a vehicle, with a pivotably mounted air guide device which can be moved by means of a kinematic arrangement into a retracted first function position and into a fully extended second function position and vice versa, wherein the air guide device is configured in two parts and has a first and a second trim part which are connected together so as to be adjustable relative to one another, and wherein the kinematic arrangement is formed by a primary and a secondary lever drive, and wherein an actuator is attached to the body element in a region of a side member, wherein the actuator acts on a shaft running in a longitudinal direction and acts to initiate a rotary movement, and this adjustment movement is transmitted via the primary lever drive to the first trim part, characterized in that the first and second trim parts are pivotably connected together, and that the primary lever drive comprises a first lever and a rocker, wherein the first lever is mounted rotationally fixedly on the shaft by means of its first end region, and a second end region of the lever is attached via a first pivot joint to a first end region of the rocker, and wherein in a middle region, the rocker comprises an articulated connection to the first trim part, and the second trim part is hinged to the primary lever drive via a connection by means of the secondary lever drive.

2. The trim panel arrangement according to claim 1, wherein the body element is a sill/side member running in the longitudinal direction.

3. The trim panel arrangement according to claim 2, wherein the trim panel arrangement comprises a first trim element running in the longitudinal direction, which is preferably made of a form-rigid plastic material and covers the side member between a front wheel and a rear wheel towards the outside (Z direction) and downward (Y direction).

4. The trim panel arrangement according to claim 1, wherein the first trim part is a strip-like flap element which extends in the longitudinal direction and is connected to the body element in a region of a lower front edge of the first trim element so as to be pivotable about a longitudinal axis, and that the second trim part is a strip-like flap element which extends in the longitudinal direction and is attached directly to a long side of the trim part facing away from the trim element so as to be pivotable about a longitudinal axis.

5. The trim panel arrangement according to claim 4, wherein a width of the second trim part is many times smaller than a width of the first trim part.

6. The trim panel arrangement according to claim 1, wherein in the first function position, the first trim part runs parallel to an underside of the side member, and the second trim part is held, starting from a lower edge of the first trim part, pivoted in a position pointing approximately vertically upward in the Z direction.

7. The trim panel arrangement according to claim 1, wherein the secondary lever drive comprises a second lever, which at its first end region is attached via a third pivot joint to a second end region of the rocker, and at its second end region is attached via a fourth pivot joint to the second trim part.

8. A method for forced movement of an air guide device according to claim 1, characterized in that during an adjustment movement from the first function position to the second function position, by means of the primary lever drive, the first trim part is pivoted outward and downward, and during this adjustment movement, at the same time via the secondary lever drive, a twist of the second trim part is provoked about a pivot axis S3 such that the second trim part, starting from a position pointing upward in the Z direction, is oriented into a position pointing downward in the Z direction.

* * * * *